Figure 6:
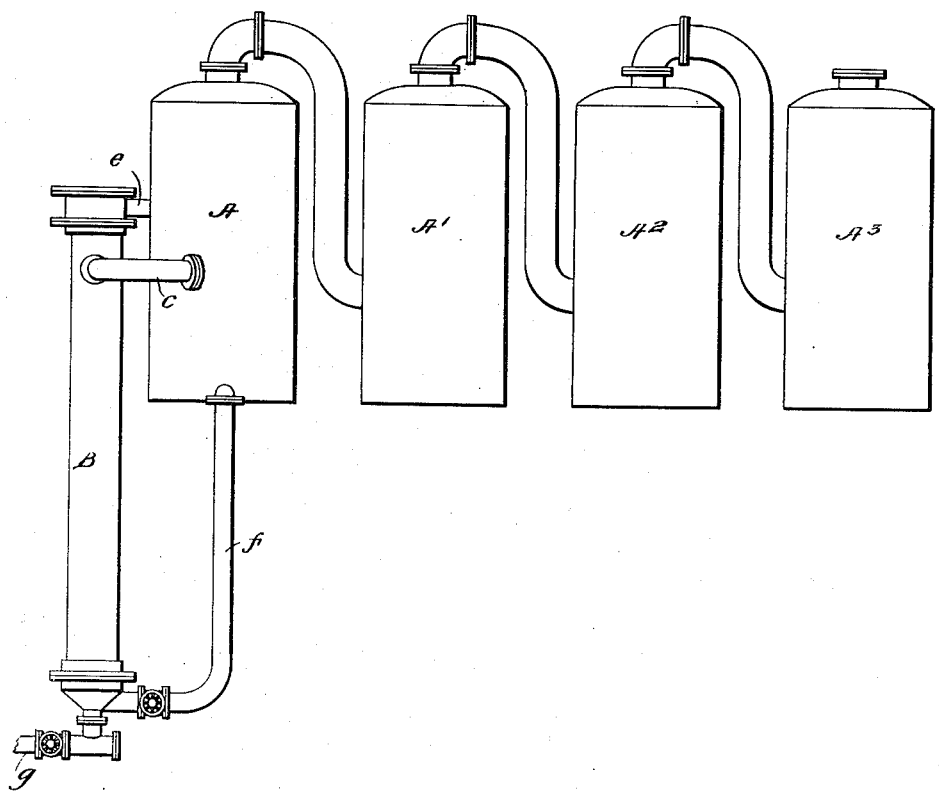

P. KESTNER.
EVAPORATOR.
APPLICATION FILED AUG. 31, 1906.
965,388.
Patented July 26, 1910.
4 SHEETS—SHEET 1.
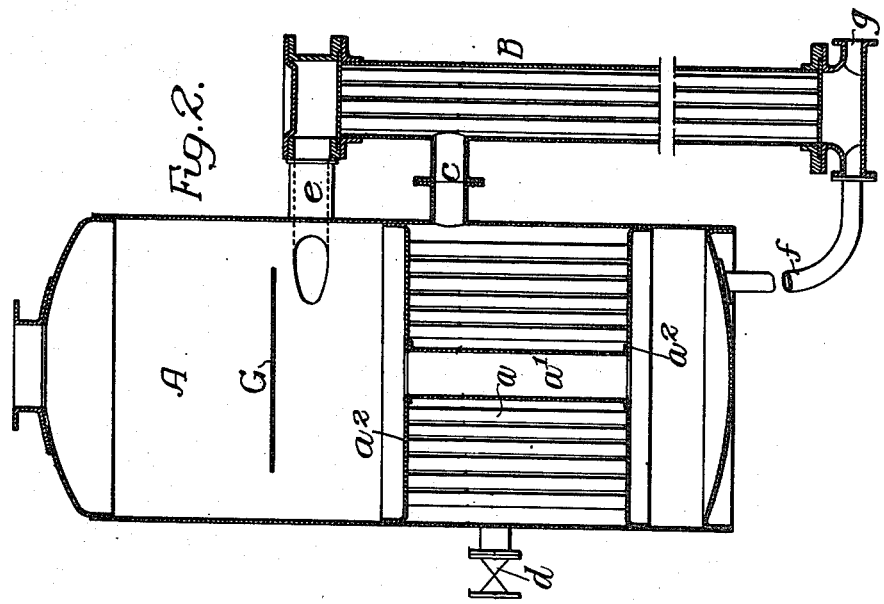
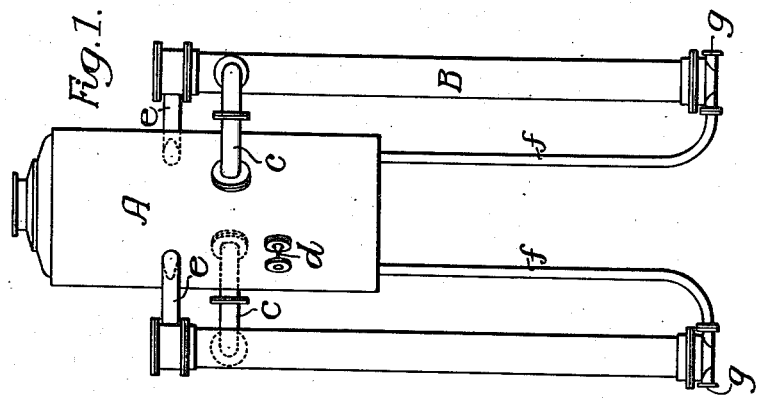
Witnesses:
Inventor:
Paul Kestner,
by his Attorneys.

P. KESTNER.
EVAPORATOR.
APPLICATION FILED AUG. 31, 1906.
965,388.
Patented July 26, 1910.
4 SHEETS—SHEET 2.
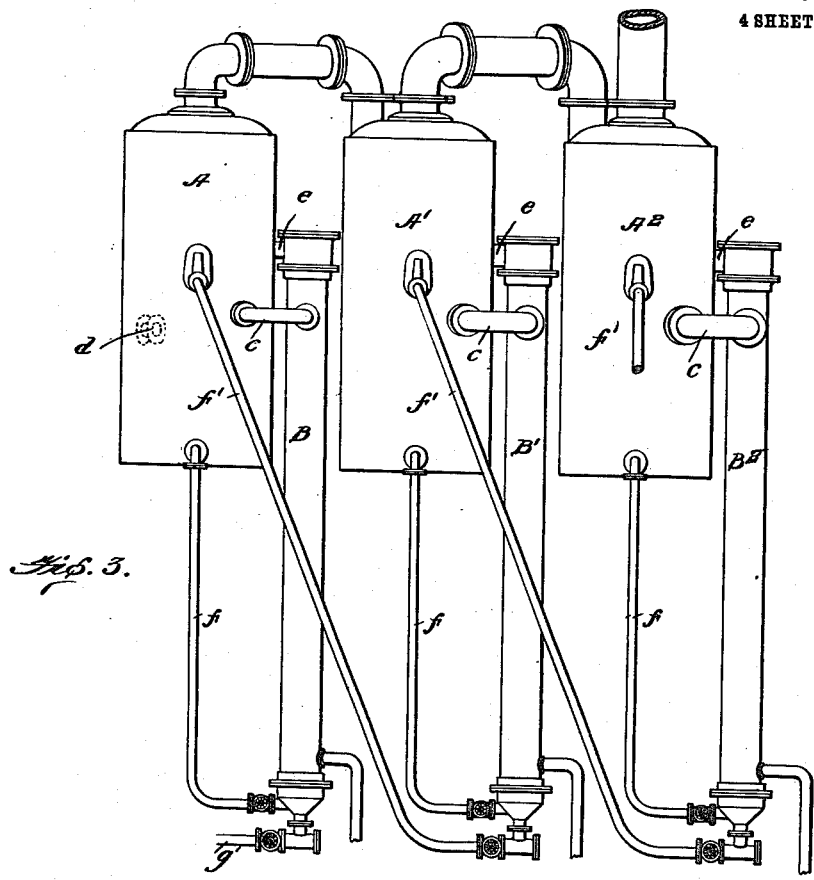

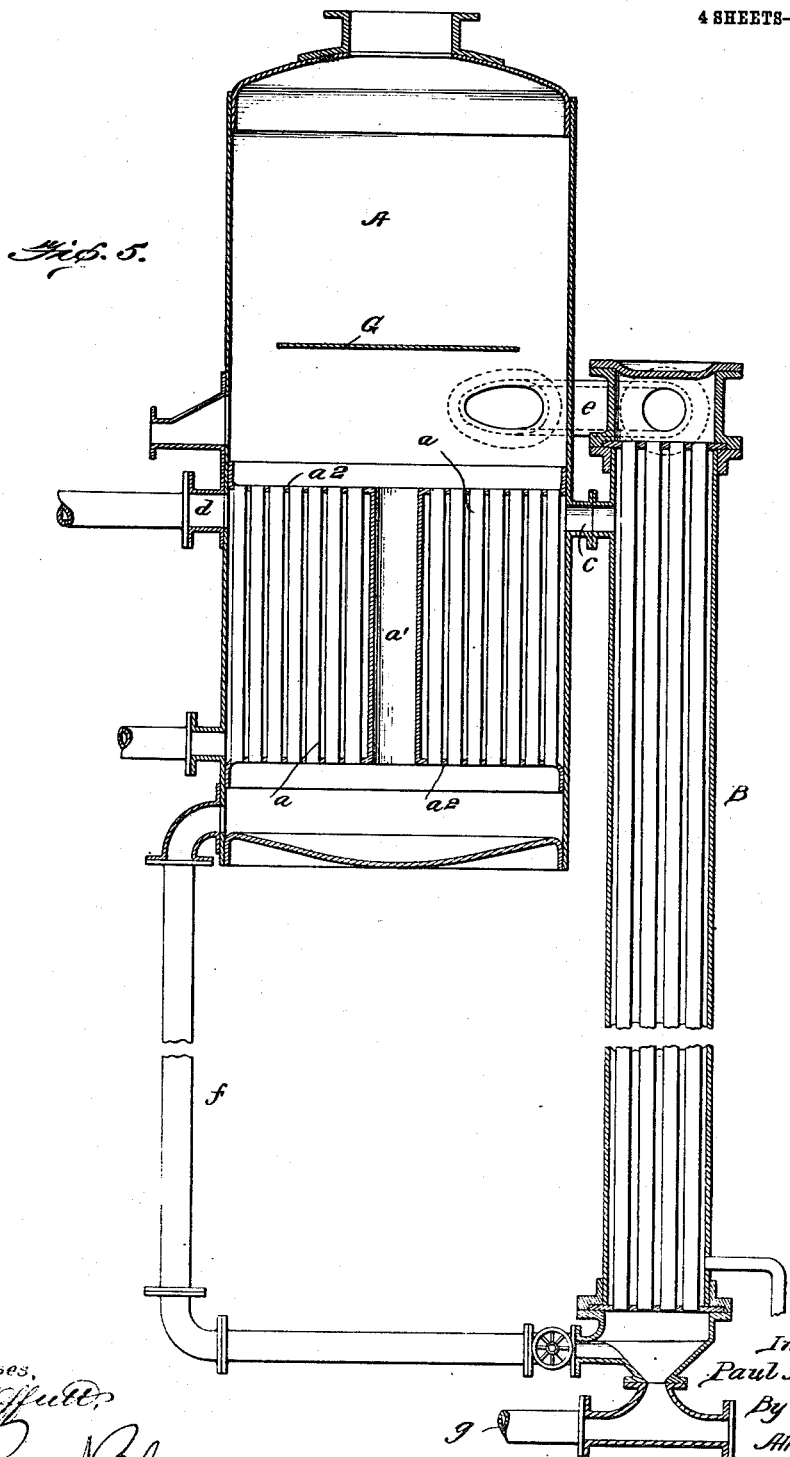

P. KESTNER.
EVAPORATOR.
APPLICATION FILED AUG. 31, 1906.

965,388.

Patented July 26, 1910.
4 SHEETS—SHEET 4.

UNITED STATES PATENT OFFICE.

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

EVAPORATOR.

965,388.  Specification of Letters Patent.  Patented July 26, 1910.

Application filed August 31, 1906.  Serial No. 332,863.

*To all whom it may concern:*

Be it known that I, PAUL KESTNER, a citizen of the French Republic, residing at Lille, in the Nord Province of France, have invented certain Improvements in Evaporating Apparatus, of which the following is a specification.

My invention relates to concentrating or evaporating apparatus, and has reference to an improved evaporator to be used for concentrating liquids and is especially useful for such liquids as cause scaling on the heating surfaces and also for such liquors—for example, glue, gelatin, extracts of various kinds and even sugar juices, which are likely to be injuriously affected if allowed to remain for any length of time in stationary contact with a heated surface.

The objects of my invention are to prevent or at least considerably reduce the amount of such scaling and also to enable those parts of the evaporator in which the scaling takes place to be from time to time cleaned without interfering to any material extent with the process of evaporation and concentration carried on.

By means of my improved evaporator other advantages are also attained which will hereinafter be referred to.

My improved evaporator consists for each effect of a plurality of elements comprising a main element and secondary elements, the latter of which are so connected with the former that steam admitted into the main element will also enter the secondary elements so as to impart the required heat to all the elements for the concentrating process. Each of the secondary elements is, further, so connected with the main element that the liquid to be concentrated will circulate through both and preferably also so that the vapor evolved in the secondary elements will so enter the main element as to prevent priming therein.

In the accompanying drawings: Figure 1, shows an evaporating apparatus embodying my invention, comprising a main element and two secondary elements; Fig. 2, is a sectional view of the main and one of the secondary elements; Fig. 3, is a view in elevation of a structure made in accordance with my invention, showing a triple effect evaporating apparatus, with each effect of which the additional or secondary element has been combined; Fig. 4, is a plan view of the apparatus shown in Fig. 3; Fig. 5, is a sectional view of one of the main and secondary elements of the structure shown in Fig. 3, and Fig. 6, is a view illustrating an ordinary quadruple effect evaporating apparatus, with the first effect of which one of the secondary evaporating elements has been combined.

In operation, vacuum pans of the ordinary designs often prove ineffecient for various reasons. If not well designed, circulation is apt to be defective, dead air spaces exist where air accumulates and prevents access of steam and deranges its normal circulation, or entrainment is excessive. Further, it is often desirable to add additional evaporative capacity to an existing plant without remodeling the old apparatus or sacrificing additional floor space.

It is the object of my invention to obviate the noted defects and secure the stated advantages. To this end, I add to the old type pans certain novel and peculiar auxiliary evaporating devices whereby liquid and steam circulation are made positive and automatic, even in badly designed pans, and entrainment is prevented, and whereby the evaporative capacity of the plant is enormously increased. In my invention, the old pans have connected with them a tube nest of relatively long narrow tubes in a steam chamber adapted to draw its steam supply from near the top of the steam chamber of the ordinary pan. This connection prevents air accumulating in the top of the chamber of the ordinary pan while by reason of the narrow diameter of the secondary pan vapor velocities therein are too great to permit the steam chamber becoming air bound. By connecting the vapor delivery of the auxiliary or secondary pan to the vapor space of the first pan in the hereinafter described manner, circulation in the first pan is much improved and entrainment suppressed. By reason of the relatively long and narrow form of the auxiliary pans, they may be directly attached to the ordinary pans, without use of floor room, and, with multiple effects they may be advantageously placed in the angles between the several effects.

The improved form of evaporator which I have combined with the old type of concentrating apparatus employing vacuum pans in single or multiple effect, relates to that class of apparatus in which evaporation is carried on in vertically disposed tubes, and it consists of a structure having tubes of relatively great length disposed within an inclosing shell, to which heat, preferably in the form of steam is admitted to reduce the water content of the liquid under process of treatment. This apparatus is based upon a novel method of circulating the liquid to be concentrated, whereby it is caused to rise within said tubes, from a body of liquid fed to the bottom of the same, in a series of ascending films clinging to the inner surface of such tubes, such films being caused by the presence of steam from said liquid, which carries the latter in a thin stream in a more or less concentrated condition to the top of said tubes where the liquid is caught and may be passed to another structure employing a similar set of tubes or otherwise disposed of, and wherein the steam is passed through a separator whereby the liquid entrained therewith may be removed; the steam passing to the next effect, or disposed of as may be desired. In the present application of this system the liquid and vapor is returned to the main pan. This evaporating system is based on the theory that when in a tube, no matter what may be its position and its diameter, and wherein a current of vapor is formed in an amount sufficient to flow with a velocity equal to or above twenty-two feet per second, we admit a small quantity of liquid, this liquid will be forced along the internal walls of the tube in a thin uniform layer, though traveling with a velocity relatively slow, which depends on physical conditions, such as density, viscosity, etc. If the tube be vertical and the circulation takes place from the bottom toward the top, the phenomenon takes the form which I have termed "creepage"; that is to say, the apparatus operates with substantially empty film lined tubes, receiving from a feed pipe, controlled by a suitable valve only that quantity of liquid that may be concentrated to the desired point in a single passage through the tubes, from the bottom to the top.

In the drawings herewith, A is the main element of well known construction and B the secondary elements, the latter being of considerable length compared with the former and arranged relatively thereto about as shown, that is to say, the secondary elements reach at their upper ends to substantially half way up the main element and their lower ends extend to considerably below that of the main element. The main element is provided at its lower part with vertical tubes $a$ of suitable dimensions and a central tube $a'$ of comparatively large diameter; the said tubes being carried in tube plates $a^2$ in the usual manner. The elements B are also provided with vertical tubes carried in tube plates but which tubes extend for the greater part of the length of the elements and the elements B are connected to the element A by pipes $c$ so that when steam is admitted through a cock $d$ to surround and heat the tubes $a$ steam will also flow into and heat the tubes within the shell of each element B; any condensed water being got rid of in the usual manner by draw-off cocks or otherwise.

The elements A and B are also connected by liquid pipes $f$ and $e$, the former of which lead from the lower part of A into the bottom of B, and the pipes $e$ lead from the upper end of B into the element A at a suitable height above the tubes $a$. The elements A and B having been supplied with liquid when steam is admitted around the tubes in A and in B, the said liquid will be caused to circulate; rising up the element B then flowing into the element A then circulating therein and finally descending through the pipe or pipes $f$ back into the bottom of the secondary elements B.

To prevent priming in the element A, I lead the pipes $e$ tangentially thereinto so that the vapors passing from the secondary elements B into A will be caused to move in a rotary direction in A and will impart a rotary motion to the vapors evolved in A the result of which will be that priming in A will be substantially entirely prevented.

Experience shows that as a rule scaling takes place on that heating surface of the evaporator with which the thin liquid is in contact and in order that I may, without interfering with the continuity of the evaporating process, clean the parts when they have become scaled I may introduce the thin liquid into the secondary elements B (for example at $g$) and I provide any suitable means whereby any one of these secondary elements may be cut out. This arrangement results in a complex system of circulation. In addition to the ordinary up and down circulation in pan A caused by the differential heating of the liquid in the wide and narrow vertical tubes, there is a cyclic circulation between the two pans, liquid from A descending through pipe $f$, thence upward through the auxiliary pan B, and back to A, together with generated vapors, through $e$; this circulation being ordinarily somewhat assisted by the surface cooling of pipe $f$ by the air. Further, since pipe $e$ discharges tangentially into A above the liquid level a number of new results are accomplished. The vapors form a whirl which tends to throw the accompanying liquid by centrifugal action outward against the pan wall, thence to trickle downward into the main body of liquid, and which destroys the ordinary vertical upward stream of vapor from the liquid boiling in A. In any boiling liquid, at the instant a bubble breaks it throws upward a droplet of liquid which, in the ordinary vacuum pans, is carried forward or entrained by the uprushing current of vapor, necessitating special devices in the vapor line to collect and return entrained liquid. With the tangentially instreaming current of vapor these droplets in lieu of being carried upward are whirled against the side of the pan. Again, the whirl of the vapors produces a corresponding movement of the surface liquid in the pan which much facilitates evaporation and also aids the downward circulation through the central tube $a'$. The natural form of a gaseous whirlpool being with the cone pointing upward, the cross baffle plate shown acts to suppress any possible central upward movement of entrained liquid. With the liquid fed into the base of the auxiliary pan B, as is preferably done, it receives its first heating and evaporation therein, and deposits whatever scale forming bodies it carries in this pan. The narrowness of this pan permits the use of full-width manholes and consequent easy access to each tube, something which is impossible with the ordinary type of vacuum pan, as for instance pan A. Operating in the manner described all or most of the scale is deposited in pan B and pan A can consequently run for long periods of time without cleaning.

In Figs. 3, 4 and 5, I have illustrated an evaporating apparatus of triple effect, in which the arrangement of vertical evaporating tubes under the "creepage" system and forming the secondary elements, have been applied to each effect. The ordinary vacuum pans are indicated at A, A', and A², while the secondary or supplemental evaporators are indicated at B, B' and B². In this instance, the series of vertical tubes within the structure B' coupled with the second effect, is fed by means of a pipe $g'$ extending from a point substantially at the level of the body of liquid in the vacuum pan A to the usual inlet at the bottom of said vertical tubes. In this form of combined apparatus embodying my invention, the chamber at the base of the element B communicating with the set of vertical tubes therein may be provided with a valve designed to throttle the feed and insure that only that quantity of liquid which may be brought to the desired density in a single passage through said tubes is fed thereto, and for the other sets of evaporating tubes in the elements B' and B² I may provide similar valves or those of self-regulating type.

The entrained liquid and steam rising in the vertical tubes within the structure B enter the pan A through the pipe $e$, whose opening into said pan A is disposed tangentially, so that the incoming volume of steam and liquid will partake of a whirling motion and effect a separation of the liquid from the steam. The separated steam passes from the top of the pan A to another effect, while the liquid drops into the main body of the same within said pan. To assist in this separation, the pan A is provided with a baffle-plate G suitably supported within the upper chamber of said pan and providing sufficient space between its edge and the wall of the pan to permit the passage of the separated steam.

Fig. 4, is a plan view of the structure shown in Fig. 2; indicating the relative position of the various parts of the combined apparatus, and Fig. 5, is a sectional view of one of the main and secondary elements of the same.

The structure illustrated in Fig. 6, shows simply an evaporating apparatus of quadruple effect, in which the structure having the elongated vertical evaporating tubes has been applied to the first effect only. The connections, and the method of operation are substantially the same as that described with relation to the structures of the other figures of the drawings; the purpose of this view being to indicate the ready application of the improved apparatus to evaporating structures already in use.

I claim—

1. An evaporating apparatus, comprising an evaporating pan adapted to contain and evaporate a body of liquid, and means for withdrawing and evaporating a portion of the liquid from the base of said pan, evaporating the same in an auxiliary pan in liquid and vapor communication with the main pan and returning said liquid with resultant vapors tangentially into said main pan above the level of liquid therein.

2. An evaporating apparatus, comprising an evaporating pan adapted to contain and evaporate a body of liquid, and an auxiliary evaporating pan in liquid communication at its base with the first pan and provided at its upper end with means for discharging tangentially into said pan above the level of liquid therein the liquid evaporated in said auxiliary pan with its resultant vapors.

3. An evaporating apparatus, comprising an evaporating pan adapted to contain and evaporate a body of liquid, an auxiliary evaporating pan comprising a steam chamber with upright tubes disposed therein, a connection delivering liquid from the first pan into the base of said tubes, and a connection delivering liquid and vapor from the upper end of the tubes tangentially into the first pan above the level of liquid therein.

4. An evaporating apparatus, comprising a vapor heated evaporating pan adapted to contain and evaporate a body of liquid, an auxiliary evaporating pan comprising a heating chamber with elongated vertical tubes disposed therein, a connection between the heating elements of the first pan and the heating chamber of the second, a connection delivering liquids from the first pan into the base of the vertical tubes, and a connection delivering liquid and vapor from the upper end of the tubes into the first pan above the level of liquid therein.

5. In an evaporating apparatus, the combination of a vacuum pan having an evaporating space substantially twice as high as its diameter, and an auxiliary evaporator comprising a series of long, vertically disposed, vapor heated tubes extending some distance below said vacuum pan and in liquid connection at their base with said pan, said auxiliary evaporator being arranged to discharge from the upper ends of its tubes vapor and fluid tangentially into the vapor space of said vacuum pan above the level of liquid therein.

6. In an evaporating apparatus, a closed evaporating pan provided with a horizontal baffle plate above the liquid level, and means for introducing a tangential vapor current into the pan below said baffle plate.

7. In evaporating apparatus, the combination of a closed vacuum pan for containing a relatively large body of liquid and having a relatively small heating surface, an auxiliary evaporator for containing a relatively small proportion of liquid and having a relatively large heating surface, said auxiliary evaporator comprising a series of elongated vapor heated tubes disposed exteriorly of said vacuum pan, a casing for said tubes in vapor connection with the heating elements of the vacuum pan, and a connection between the liquid spaces of said vacuum pan and auxiliary evaporator.

8. In an evaporating apparatus, the combination of a closed vacuum pan, an auxiliary evaporator comprising a series of vapor-heated tubes from which ascending bodies of vapor and liquid are discharged into the vapor space of the vacuum pan above the level of liquid therein, and means for feeding liquid to the base of said tubes for ascension therein, and a connection between the liquid spaces of said vacuum pan and auxiliary evaporator.

9. In an evaporating apparatus, the combination of a main evaporating pan closed to the atmosphere, an auxiliary evaporator comprising a casing in which is mounted a series of vapor heated tubes delivering ascending bodies of liquid and vapor into the vapor space of said closed pan above the level of liquid therein, said auxiliary evaporator having communication at its base with the liquid space in the main evaporating pan, provision for the inlet of fresh liquid to the base of said auxiliary evaporator, and a connection between the heating spaces of said main and auxiliary evaporators.

10. In an evaporating apparatus, the combination of a closed evaporating pan, an auxiliary evaporator comprising a series of relatively long vapor-heated tubes having their upper ends above the normal liquid level of the first pan, said tubes delivering ascending bodies of liquid and vapor tangentially into the vapor space of said pan above the level of liquid therein, and means for feeding liquid to the base of said tubes for ascension therein.

11. In an evaporating apparatus, the combination of an evaporating pan containing a series of vertical passages, said passages comprising a series of narrow tubes encircling a central wider tube, means for discharging a current of vapor and liquid tangentially into the vapor space of said pan at a point above the normal liquid level therein, and means for supplying a heating medium to said pan.

12. In an evaporating apparatus, the combination of a pair of evaporating pans having vapor connection between their heating elements, and a liquid connection between their liquid containing chambers, one of said pans having tubes of relatively short length, while the other pan has tubes of greater length, the upper ends of which latter tubes are at a point above the normal level of liquid in the first pan whereby liquid and resultant vapors may be discharged into the vapor space of said first pan, the connection between such elements providing for the inlet of said liquid and vapor in a tangential path.

13. In an evaporating apparatus, the combination of a vapor heated evaporating pan, and an auxiliary evaporator of relatively small volume having a series of narrow elongated vertically disposed vapor-heated tubes, said tubes being in liquid and vapor communication with the first pan, and said auxiliary evaporator drawing vapor for heating from the upper portion of the vapor chamber of said first pan.

14. In an evaporating apparatus, the combination of a main evaporating element comprising a closed pan, a plurality of secondary evaporating elements so connected to the main element that liquid to be concentrated may circulate upwardly through each of the secondary elements and be discharged therefrom into the main element for passage downwardly through the latter and subsequent passage to the secondary elements, connections between the liquid spaces of said main and secondary elements, and means whereby said secondary elements may be placed out of communication with the rest of the apparatus.

15. In an evaporating apparatus, the combination of a closed vacuum pan having a main evaporating element, a series of circulating tubes in the lower part of the same, a plurality of secondary evaporating elements containing a series of circulating tubes of greater length than the tubes of the main element, the upper ends of the tubes of said secondary elements reaching to a point above the tubes within the main element, liquid and vapor connections between the upper ends of the secondary elements and the main element, liquid connection between the base of the main element and the base of the secondary elements, connections for the passage of a heating medium between said elements, the first-named connections opening in the main evaporating element above the normal level of liquid therein whereby the vapors generated in the secondary elements may be discharged tangentially into the vapor space of said main element, and a horizontal baffle plate mounted in said vapor space.

16. An evaporating apparatus, comprising an evaporating pan adapted to contain and evaporate a body of liquid, means for withdrawing a portion of the liquid from said pan, evaporating the same in an auxiliary pan in liquid and vapor communication with the main pan and returning said liquid with resultant vapors tangentially into said main pan, and a horizontal baffle plate within the vapor space of the main pan below which said liquid and vapor is discharged.

17. In an evaporating apparatus, the combination of a closed vacuum pan provided with a horizontal baffle plate above the level of liquid therein, an auxiliary evaporator comprising a series of vapor-heated tubes extending some distance below said vacuum pan, and a connection between the upper end of said auxiliary evaporator and the closed vacuum pan for delivering vapor and liquid into the vacuum pan below said baffle plate.

18. An evaporating apparatus, comprising a closed evaporating pan having a horizontal baffle-plate within its vapor space above the level of liquid therein and adapted to contain and evaporate a body of liquid, and an auxiliary evaporating pan in liquid communication at its base with the first pan and provided with means for discharging vapors generated therein tangentially into the first pan below said baffle-plate.

19. In an evaporating apparatus, the combination of a closed vacuum pan provided with a horizontal baffle-plate above the liquid level, and an auxiliary evaporator in liquid and vapor connection therewith, said auxiliary evaporator comprising a series of vapor heated tubes in vapor connection with the heating elements of the vacuum pan, and discharging liquid and resultant vapor tangentially into said pan below the baffle-plate.

In testimony whereof I have signed my name to this specification in the presence of two subscribing witnesses.

PAUL KESTNER.

Witnesses:
CHARRIER LEIN,
LEÓN PECKEL.